United States Patent
Lee et al.

(10) Patent No.: US 7,843,885 B2
(45) Date of Patent: Nov. 30, 2010

(54) APPARATUS AND METHOD FOR MANAGING DORMANT STATE IN A WIRELESS PACKET DATA SYSTEM

(75) Inventors: Sung-Won Lee, Songnam-shi (KR); Tae-Won Kim, Seoul (KR); Hyun-Seok Lee, Songnam-shi (KR); Yong Chang, Songnam-shi (KR); Jae-Hyuk Do, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 704 days.

(21) Appl. No.: 11/775,736

(22) Filed: Jul. 10, 2007

(65) Prior Publication Data

US 2008/0013492 A1 Jan. 17, 2008

Related U.S. Application Data

(63) Continuation of application No. 09/931,818, filed on Aug. 17, 2001, now Pat. No. 7,283,495.

(30) Foreign Application Priority Data

Aug. 19, 2000 (KR) ............... 10-2000-0048180

(51) Int. Cl.
*H04W 4/00* (2009.01)
(52) U.S. Cl. .................. 370/331; 455/436; 370/338
(58) Field of Classification Search ............. 370/331, 370/338, 328; 455/436, 435.1, 456.1
See application file for complete search history.

(56) References Cited

U.S. PATENT DOCUMENTS

| | | | |
|---|---|---|---|
| 5,506,867 A * | 4/1996 | Kotzin et al. ............ 375/220 |
| 6,216,004 B1 * | 4/2001 | Tiedemann et al. ........ 455/442 |
| 6,295,452 B1 * | 9/2001 | Choi ..................... 455/436 |
| 6,370,390 B1 | 4/2002 | Salin et al. |
| 6,404,754 B1 | 6/2002 | Lim |
| 6,490,268 B1 * | 12/2002 | Lee et al. ................ 370/342 |
| 6,490,453 B1 * | 12/2002 | Lee et al. ................ 455/450 |
| 6,519,235 B1 | 2/2003 | Kim et al. |
| 6,519,457 B1 * | 2/2003 | Jiang et al. .............. 455/442 |
| 6,556,820 B1 | 4/2003 | Le et al. |
| 6,580,699 B1 | 6/2003 | Manning et al. |
| 6,614,772 B1 | 9/2003 | Sexton et al. |

(Continued)

OTHER PUBLICATIONS

Mobile IP for 3G Wireless Networks, pub date 2000.*
Qos Consideration on the Third Generation (3G) Wirless Systems, pub date 2000.*
Mobility and Session Management: UMTS vs. CDMA2000, pub date 2004.*
Cellular-IP Principle Based Mobility Mangement for IXCDMA Network, pub date 2003.*

*Primary Examiner*—Salman Ahmed
(74) *Attorney, Agent, or Firm*—The Farrell Law Firm, LLP

(57) ABSTRACT

A wireless packet data system efficiently manages a location of a packet call in a radio environment. A mobile station transmits a location registration message to a target BSC when moving to the target BSC adjacent to a source BSC. Upon receipt of the location registration message, the target BSC transmits a location update message for updating a location of the mobile station to a centralized database. Upon receipt of the location update message, the centralized database updates dormant state information for the mobile station to connect the target BSC to the source BSC. The centralized database transmits a location update result message indicating complete update of the dormant state information to the target BSC.

19 Claims, 16 Drawing Sheets

U.S. PATENT DOCUMENTS

| | | |
|---|---|---|
| 6,707,809 B1 | 3/2004 | Warrier et al. |
| 6,731,948 B1 * | 5/2004 | Lee et al. .................... 455/522 |
| 6,751,204 B1 | 6/2004 | Foti et al. |
| 6,834,050 B1 | 12/2004 | Madour et al. |
| 6,834,190 B1 * | 12/2004 | Lee et al. .................... 455/436 |
| 6,912,214 B2 | 6/2005 | Madour et al. |
| 6,950,415 B2 * | 9/2005 | Chang et al. ................ 370/331 |
| 6,990,088 B2 * | 1/2006 | Madour ...................... 370/331 |
| 6,999,449 B2 * | 2/2006 | Barna et al. ................. 370/352 |
| 7,062,226 B2 * | 6/2006 | Lee et al. .................... 455/504 |
| RE39,673 E * | 6/2007 | Lee et al. .................... 370/342 |
| 7,283,495 B2 * | 10/2007 | Lee et al. .................... 370/331 |
| 2001/0036830 A1 * | 11/2001 | Wu et al. ..................... 455/436 |
| 2002/0021681 A1 * | 2/2002 | Madour ...................... 370/331 |
| 2002/0046277 A1 * | 4/2002 | Barna et al. ................. 709/224 |
| 2003/0003913 A1 * | 1/2003 | Chen et al. .................. 455/436 |
| 2005/0032551 A1 * | 2/2005 | Lee et al. .................... 455/560 |
| 2008/0013492 A1 * | 1/2008 | Lee et al. .................... 370/331 |

* cited by examiner

APPARATUS AND METHOD FOR MANAGING DORMANT STATE IN A WIRELESS PACKET DATA SYSTEM

PRIORITY

This application is a continuation of application Ser. No. 09/931,818, filed Aug. 17, 2001 now U.S. Pat. No. 7,283,495, which claims priority to an application entitled "Apparatus and Method for Managing Dormant State in a Wireless Packet Data System" filed in the Korean Industrial Property Office on Aug. 19, 2000 and assigned Serial No. 2000-48180, the contents of which are hereby incorporated by reference.

BACKGROUND OF THE INVENTION

1. Field of the Invention

The present invention relates generally to a wireless packet data system, and in particular, to an apparatus and method for managing a location of a packet call in a radio environment.

2. Description of the Related Art

In general, a wireless packet data system is included in a mobile communication system, and refers to a system for transmitting data in the form of a packet through a wireless network. For example, the system includes a CDMA (Code Division Multiple Access) system, a PCS (Personal Communications Services) system and a future mobile communication system such as a CDMA-2000 system and a W-CDMA system, standardisations of which are under way.

Meanwhile, the wireless packet data system manages information pertaining to a mobile in service in order to provide a packet call service. Here, since the "mobile" refers to a mobile station (MS) not a base station (BS), the information on the mobile must necessarily include location information of the mobile. Further, a base station controller (BSC) constituting the wireless packet data system processes packet data incoming to and outgoing from the mobile according to the managed location information of the mobile.

The location information is managed in different ways according to states of the mobile. In an active state and a control hold state where certain channels are established, the location information is managed through a handover. That is, since the mobile performs a handover using a dedicated signaling channel (dsch), a dedicated traffic channel (dtch) and a dedicated MAC (Medium Access Control) channel (dmch), it makes the transition from one state to another state while maintaining one or more channels to the BSC during a handover. Accordingly, the movement of the mobile in the above states can be continuously traced by the BSC.

However, if the mobile enters a dormant state where transmission and reception of the traffic is not performed because no packet data is transmitted for a predetermined time, there exists no connection between the mobile and the BSC, making it impossible to manage the location in the same way as done in the active state and the control hold state.

The dormant state means a state where such traffic as voice and packet data is not generated in a state where a radio channel is established. When the dormant state occurs, the wireless packet data system manages a location of the packet call in the dormant state to prepare for later resumption of the traffic. For this reason, the conventional wireless packet data system proposes the following four plans of managing a packet call in the dormant state, and adopts one of them.

In a first proposed plan, a home location register (HLR) and a visitor location register (VLR) take exclusive charge of the location management of a call, and a base station system (BSS) deletes all information on a call that entered the dormant state. In this case, when a packet call in the dormant state requests transmission of the packet data, the same process as a normal new call setup process is performed. That is, an initial call setup process, a registration process and an authentication process are all performed. As a result, an exchange of radio messages due to the call setup process increases a load on an RF (Radio Frequency) stage, and brings about processing loads on the VLR/HLR/AC (Authentication Center) due to the registration and authentication processes. In addition, performing the complicated call setup process causes an increase in a packet buffering time, thus increasing a delay time. In particular, it is difficult to trace a location of the mobile existing in the dormant state, so that a paging load may increase when there is a request for an incoming call to the mobile from the network.

A second proposed plan is to compensate the first proposed plan. This plan provides a plurality of the VLRs/HLRs in order to decrease the processing loads of the single VLR/HLR performing the location management. In this plan, location management of the mobiles is not processed in the single VLR/HLR, but the mobility of all the mobiles is processed by a plurality of the VLRs/HLRs on a load shared basis. Therefore, the BSCs determine the VLR/HLR managing the location information of the corresponding mobile using an identifier (ID) of the mobile, and then acquire the mobile information through the corresponding VLR/HLR. However, as the second plan is fundamentally performed in the same procedure as the first plan, the second plan is somewhat effective in decreasing the load on the VLR/HLR but still has the other disadvantages.

A third proposed plan stores an ID of a source BSC initially accessed by the mobile for a packet data service until the call is released, and performs location management and dormant state management of the corresponding mobile by utilizing the stored information. That is, when the mobile is activated in the dormant state, the mobile provides the ID of the initially accessed BSC (source BSC) to a newly accessed BSC (hereinafter, referred to a "target BSC"). In this case, when processing a registration message of the mobile, the target BSC can rapidly access a dormant state database (DB) of the mobile whose packet service is activated. However, to this end, the radio interface standard must be changed undesirably. That is, the message format must be changed such that the mobile can transmit the ID of the source BSC to the target BSC.

A fourth proposed plan is to construct a small-scale VLR not unlike the VLR/HLR connected to a mobile switching center (MSC), and arrange the small-scale VLR in a network where a new server exclusively manages the dormant state of the mobiles. This small-scale VLR is constructed as a BSC. That is, the small-scale VLR is arranged in a network where a separate server is constructed as a BSC, and the BSCs acquire and update the information on the data service call in the dormant state from the separate server. In this case though, it is necessary to construct separate hardware, and guarantee the VLR/HLR-level safety to the new device. In addition, from a viewpoint of the BSCs, there exists an overhead that the BSCs should simultaneously register all the registration messages in the MSC and the separate server as well.

SUMMARY OF THE INVENTION

It is, therefore, an object of the present invention to provide an apparatus and method for effectively embodying a packet data service without a separate device and modification of the radio interface standard in a wireless packet data system.

It is another object of the present invention to provide an apparatus and method for managing mobiles in a dormant state in a BSC, thereby enabling termination of a packet call to the mobile and rapid reconnection.

It is further another object of the present invention to provide an apparatus and method for enabling reconnection to a previous PPP (Point-to-Point Protocol) access point in a BSC, upon receipt of a call originated from a mobile in a dormant state.

It is yet another object of the present invention to provide an apparatus and method for readily performing a service for managing a mobile in a dormant state even though traffic through an IP (Internet Protocol) network becomes larger than a capacity of a voice call.

It is still another object of the present invention to provide an apparatus and method in which an error occurred in a certain BSC does not affect a service performed by another BSC.

It is still another object of the present invention to provide an apparatus and method in which BSCs have search and addition/deletion functions for effective database management by maintaining information on the maximum number of mobiles in the dormant state.

According to one aspect of the present invention, there is provided a method for storing dormant state information of mobile stations in a dormant state where no packet data is exchanged with an external packet network, in a centralized database connected to a packet data switch, and updating the dormant state information stored in the centralized database in association with the mobile stations when a mobile station in the dormant state moves to a target BSC adjacent to a source BSC in a wireless packet data system including a packet data switch node (PDSN) for connecting the external packet network to the mobile stations through the packet data switch and the source BSC connected to the packet data switch. The method comprises the steps of transmitting a location registration message from the mobile station to the target BSC when the mobile station moves to the target BSC adjacent to the source BSC; upon receipt of the location registration message, transmitting a location update message for updating a location of the mobile station, from the target BSC to the centralized database; upon receipt of the location update message, updating dormant state information for the mobile station by the centralized database so as to connect the target BSC to the source BSC; and transmitting a location update result message indicating complete update of the dormant state information from the centralized database to the target BSC.

Preferably, the dormant state information includes an identifier of the mobile station, location information of the mobile station, a last registration time of the mobile station, and a source BSC ID of the mobile station.

Further, the dormant state information includes identifiers for connections used to exchange packet data of the mobile station in the dormant state, a temporary identifier temporarily assigned to the mobile station, a service option and service configuration.

Preferably, the location update message includes an identifier of the mobile station, and location information of the mobile station.

Preferably, the location information of the mobile station is an identifier of the target BSC.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
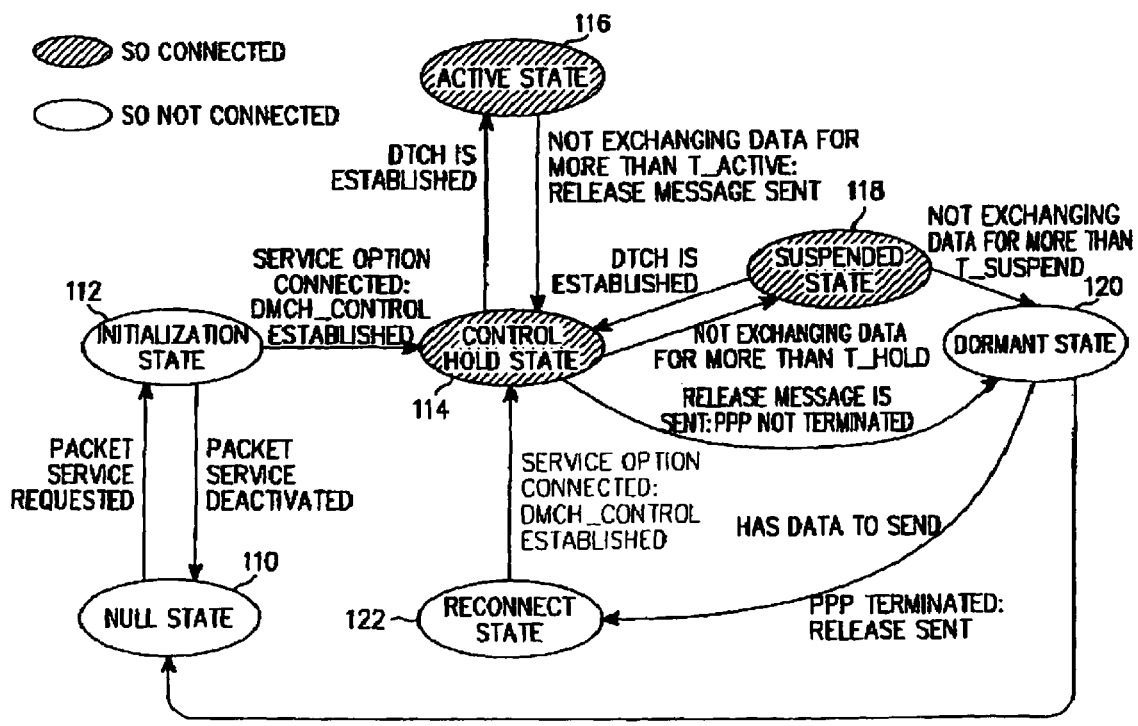
FIG. 1 is a diagram illustrating the state transitions in a mobile communication system according to an embodiment of the present invention.

A preferred embodiment of the present invention will be described herein below with reference to the accompanying drawings. In the following description, well-known functions or constructions are not described in detail since they would obscure the invention in unnecessary detail. In addition, the present invention can be applied to any wireless packet data system supporting the high-speed packet data service having the "packet activation" and "packet deactivation" attributes such as an IS-95B system, as well as the future mobile communication system such as the CDMA-200 system and the W-CDMA system.

Herein, the invention will be described with reference to a CDMA-2000 system operating under the TIA (Telecommunication Industry Association) standard, and the "mobile communication system" refers to a CDMA system.

A channel structure of the CDMA-2000 system to which the present invention is applied is divided into logical channels and physical channels. In this case, the major logical channels and the major physical channels used by a MAC (Medium Access Control) channel of the CDMA-2000 system are defined as follows. For convenience, a prefix "r-" will be attached to reverse channels, while a prefix "f-" will be attached to forward channels.

First, a function of the logical channels will be described in detail.

A dedicated signaling channel (dsch) is exclusively assigned to a specific mobile only in the active state or the control hold state. In addition, the dsch is used for transmitting and receiving an L3/Call-Control control message.

A dedicated MAC channel (dmch) is also exclusively assigned to a specific mobile only in the active state or the control hold state. In addition, the dmch is used for transmitting and receiving a control message of a MAC layer to control a dedicated traffic channel (dtch), and chiefly manages 5 ms-messages.

A common MAC channel (cmch) is commonly assigned to a plurality of mobiles only in the suspended state or the dormant state. In addition, the cmch is used for transmitting and receiving a control message of the MAC layer.

A dedicated traffic channel (dtch) is exclusively assigned to a specific mobile only in the active state, and used for transmitting and receiving the traffic.

A common traffic channel (ctch) is commonly assigned to a plurality of mobiles only in the dormant state, and used for transmitting and receiving the traffic.

Next, a function of the physical channels will be described in detail.

A dedicated control channel (DCCH) is exclusively assigned to a specific mobile to control the mobile. In addition, the DCCH supports a DTX (Discontinuous Transmission) mode where the channel band is used only when there exists the traffic to transmit. The respective users share one code by using different orthogonal long codes.

A common control channel (CCCH) is acquired by a plurality of mobiles through competition, and is mapped with the logical channel cmch.

A fundamental channel (FCH) is a channel provided considering reverse compatibility with the IS-95 system, and can be utilized for transmitting and receiving traffic control information like the conventional IS-95 fundamental channel.

A supplemental channel (SCH) is a channel corresponding to the IS-95B supplemental channel, and is based on an out-band technique for chiefly transmitting the traffic. The SCH supports a scheme which is dynamically assigned or released by the logical dmch.

FIG. 1 illustrates state transitions of a MAC layer in a mobile communication system according to an embodiment of the present invention. Referring to FIG. 1, the MAC layer has a different state according to a channel holding state, and each state transition takes place through a timer or an artificial primitive. The respective states shown in FIG. 1 will be described below.

A null state 110 is a pre-call setup state where there is no connection and no information. An initialization state 112 is a state where negotiations are carried out at an initialization request of a packet service, and in this state, call processing and various negotiations are performed through a common channel. A control hold state 114 is a state where the dedicated control channels dsch/dmch are established after the channel negotiation. In this case, the traffic channel is immediately assigned through the dmch. An active state 116 is a state where due to activation of the traffic, the dedicated traffic channel dtch is assigned through the dmch, and then, the traffic is transmitted and received through the assigned channel. A suspended state 118 is a state where the dedicated channels dsch/dmch are released and various control information is transmitted and received through the common channel. A dormant state 120 is a state where due to no traffic is exchanged for a long time, every channel under the layer 2 is released and all the information is removed. In this state, only the PPP-related access information is managed. Finally, a reconnect state 122 is a state to which transition occurs if transmission traffic is generated in the dormant state 120, and in this state, the same procedure as the initial call setup procedure is performed except the fact that the PPP information is maintained.

Meanwhile, the state transitions take place based on a timer, as shown in FIG. 1. That is, transition to the control hold state 114 happens only when no traffic is exchanged for a set time T_active after transition to the active state 116 by acquiring the dedicated traffic channel in the control hold state 114. When no traffic is exchanged for a set time T_hold in the control hold state 114, transition occurs to the suspended state 118. If the non-traffic state (the state that no traffic is exchanged) is maintained until expiration of a set time T_suspend in the suspended state 118, transition to the dormant state 120 takes place. Although the state transition diagram of FIG. 1 includes the suspended state 118, an embodiment of the invention can also be applied to a system excluding the suspended state. In this case, if no traffic is generated for the set time T_active in the active state 116, transition will happen directly to the dormant state 120 through the control hold state 114.

The invention manages a call of the mobile in the dormant state among the above states of the MAC layer, so as to rapidly transition to the active state when it is necessary to resume transmitting the packet data of the mobile. To this end, a structure of a centralized database (hereinafter, referred to as a "centralized DB") and dormant information managed by the centralized DB must be defined. In addition, a structure of a source BSC providing a packet service for the mobile in the dormant state and a database managed by the source BSC must be also defined.

Structure of Centralized DB

As mentioned above, the present invention embodies the centralized DB for managing the dormant information of the mobiles. It is possible to consider the following two plans in embodying the centralized DB.

Figure 2:
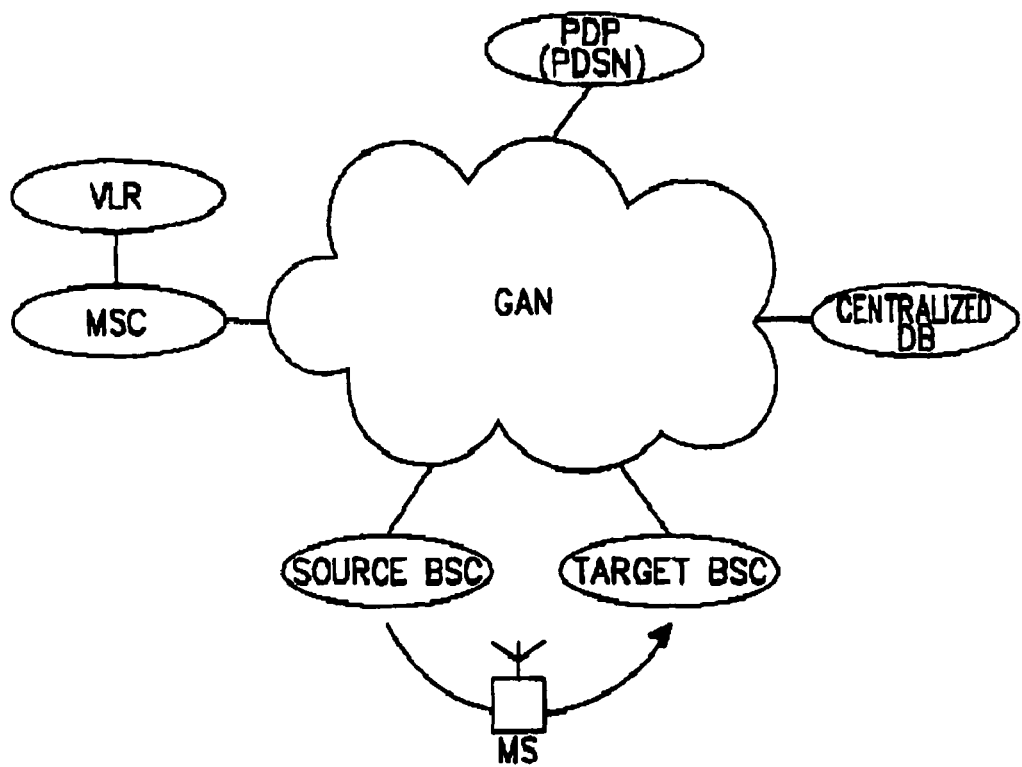
FIG. 2 is a diagram illustrating a structure of a network having a separate centralized database according to an embodiment of the present invention.

A first plan is to construct the centralized DB with a separate software or device. In this case, the corresponding network has a structure shown in FIG. 2. As illustrated in FIG. 2, the centralized DB, as a separate software or device, is connected to a global access network (GAN) which connects the network elements to one another. The GAN shown in FIG. 2 is represented by a packet data switch for switching among a plurality of BSCs, the centralized DB and a packet data switch node (PDP (Packet Data Processor)).

Figure 3A:
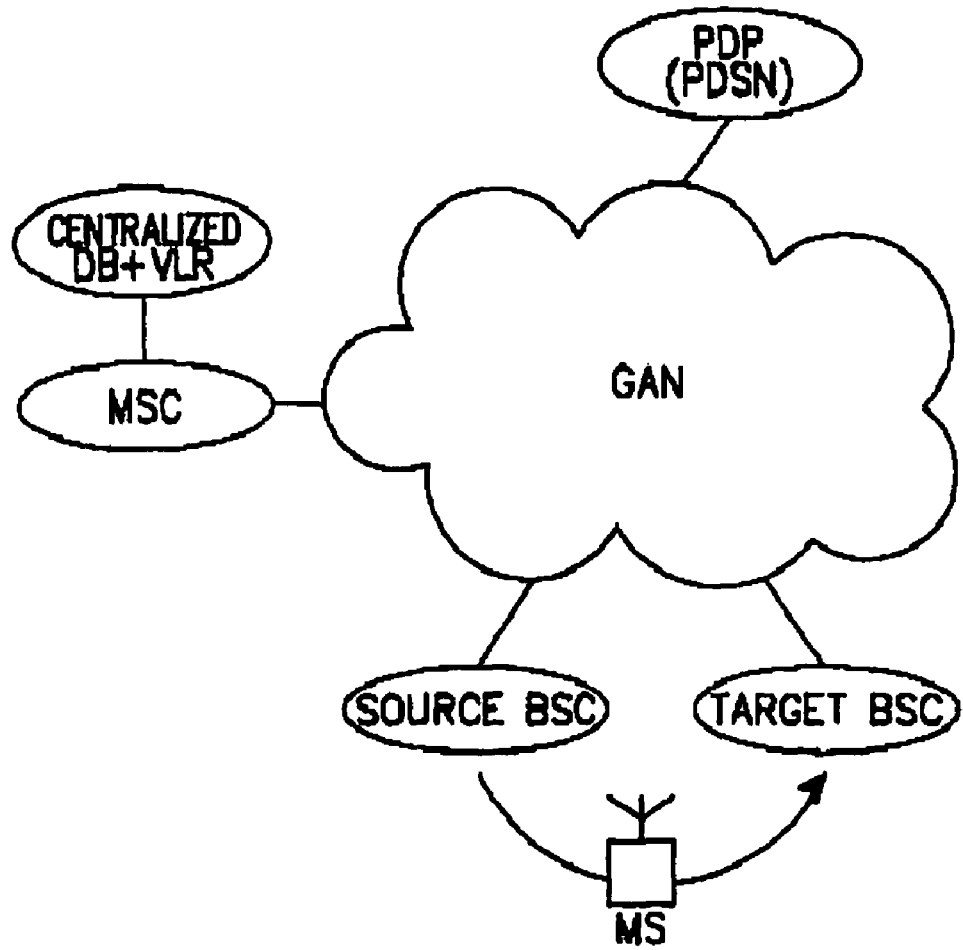
FIG. 3A is a diagram illustrating a structure of a network in which the centralized database is unified in a VLR according to an embodiment of the present invention.
Figure 3B:
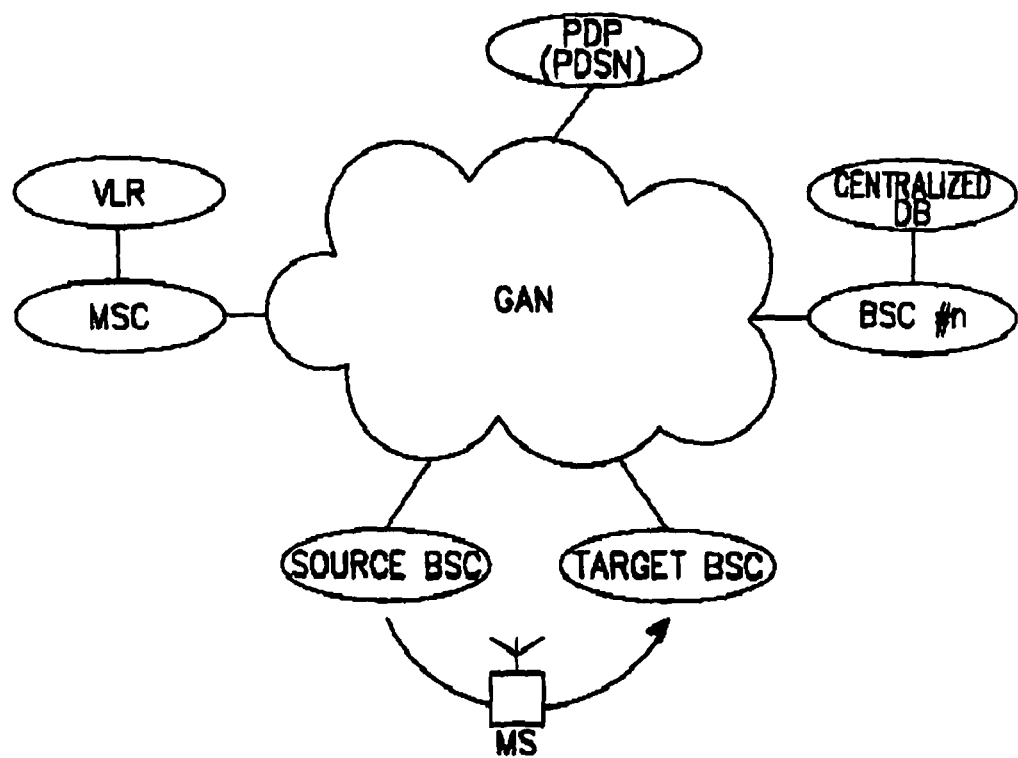
FIG. 3B is a diagram illustrating a structure of a network having the centralized database as an internal module of a specific BSC according to an embodiment of the present invention.

In a second plan, in the existing mobile communication system chiefly supporting the voice call, a mobile merges the centralized DB into the VLR managing the location information, or develops or connects the centralized DB to an internal module in a specific BSC. In this case, the corresponding network has the structures shown in FIGS. 3A and 3B.

Although the physical location of the centralized DB is different in the above two plans, the centralized DB has the same operation. Therefore, the structure and operation of the embodiment will be described with reference to the first plan shown in FIG. 2.

The centralized DB must be so embodied to manage the dormant information of the mobiles. Preferably, the centralized DB proposed as an example of the present invention has a structure shown in FIG. 4.

Figure 4:
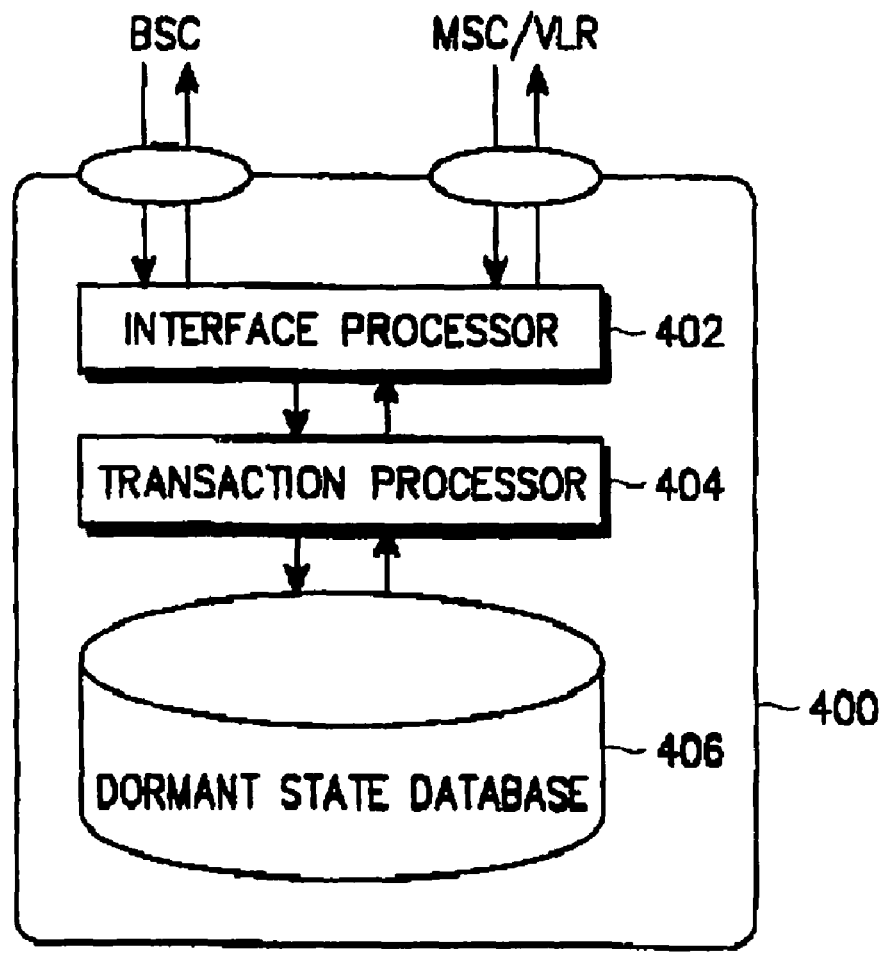
FIG. 4 is a diagram illustrating a structure of the centralized database according to an embodiment of the present invention.

Referring to FIG. 4, a centralized DB 400 according to an embodiment of the present invention includes an interface processor 402, a transaction processor 404 and a dormant state database 406. The interface processor 402 provides a communication-related input/output interface for exchanging information with the BSCs or MSC/VLR by the centralized DB 400. The transaction processor 404 supports a function of, upon receipt of a query message from the BSC and MSC/VLR, searching the dormant state database 406 for the corresponding information and then transmitting a response. In addition, the transaction processor 404 supports a function of updating the information managed by the dormant state database 406 based on the information from the BSCs and MSC/VLR. The dormant state database 406 is an information storage for storing information on the mobiles (or mobile stations (MSs)) existing in the dormant state.

Configuration of Dormant Information

Meanwhile, the dormant state database 406 included in the centralized DB 400 must store the MS information (hereinafter, referred to as "dormant information") required to implement the invention. The dormant information stored in the dormant state database 406 has the configuration shown in FIG. 5. The information shown in FIG. 5 can be classified into mandatory information and optional information. The mandatory information is information required for a service of the MS which has entered the dormant state, while the optional information is information required for efficiently supporting the packet service of the MS by a wire network. Herein, the optional information is information necessary for supporting rapid reconnection by omitting the additional negotiation and authentication process when the MS in the dormant state transits to the active state.

Figure 5:
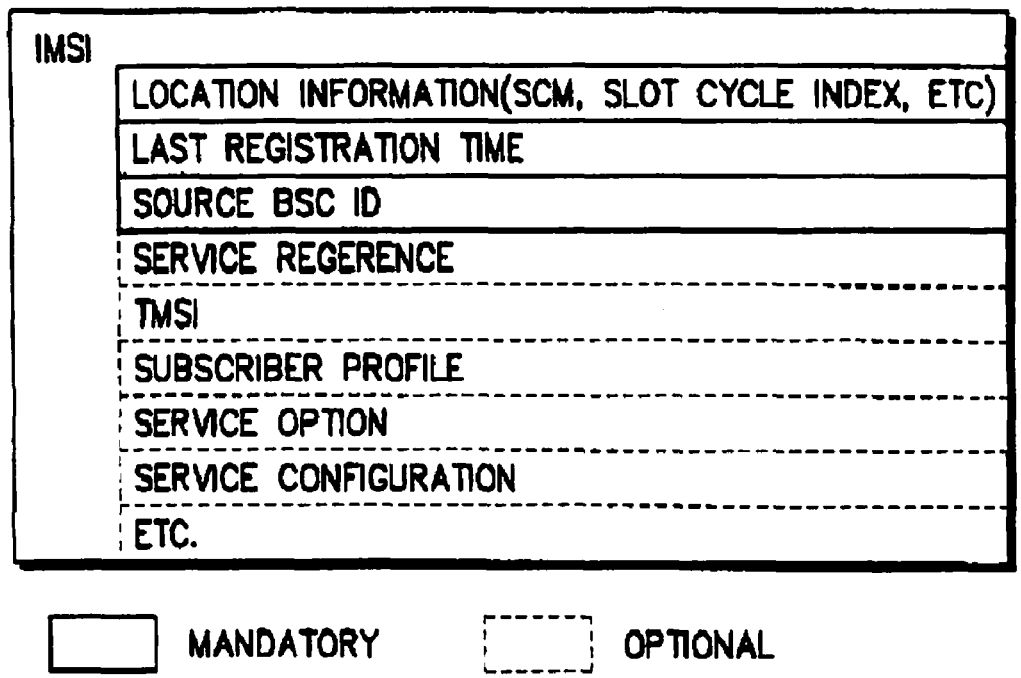
FIG. 5 is a diagram illustrating configuration of dormant information stored in a dormant state database according to an embodiment of the present invention.

First, as to the mandatory information shown in FIG. 5, IMSI (International Mobile Station Identifier) indicates an identifier for identifying the MS, and Location Information indicates information on the place where the MS having entered the dormant state is currently located. Further, Last Registration Time indicates the last time when the MS has performed communication, and Source BSC ID indicates an identifier of a BSC where a source packet data processor (PDP) of the MS exists. The PDP is a processor for managing a communication interface between a PDSN (Packet Data Switch Node) and a BSC. The PDSN is an external packet network, and the Internet is a typical example of it.

Through the mandatory information, the invention identifies the MS transited from the dormant state to the active state depending on the IMSI and then detects the source BSC where there exists the connection to the PDSN, used by the corresponding MS in the active state. Besides, when it is not necessary to manage the dormant information any longer because the MS has moved to another MSC area, the dormant information associated with the corresponding MS is deleted after a lapse of a predetermined time starting from the last registration time. Further, the invention traces the location of the MS in the dormant state for the traffic received from the PDSN.

Next, as to the optional information shown in FIG. 5, Service Reference indicates an identifier for the connections used by the MS while performing the packet data service, and TMSI (Temporary Mobile Station Identifier) indicates an identifier temporarily assigned to the MS from the network. Subscriber Profile means information on the MS or a subscriber using the radio packet service, Service Option means capability information indicating whether it is possible to support such services as voice, packet and facsimile services, and Service Configuration means the configuration of information on channel structure, data rate and quality of the service supported.

Structure of Source BSC

Figure 6:
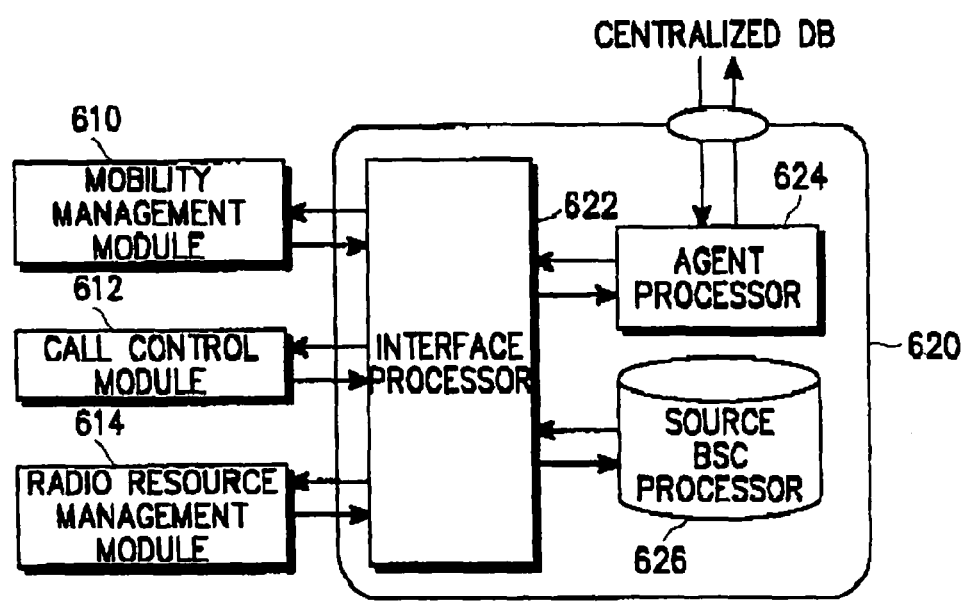
FIG. 6 is a diagram illustrating a structure of a centralized database agent module according to an embodiment of the present invention.

A structure of a centralized DB agent module of a source BSC according to an embodiment of the present invention is illustrated in FIG. 6. As illustrated, the centralized DB agent module according to an embodiment of the present invention includes a mobility management module 610, a call control module 612, a radio resource management module 614, and an interface module 620.

The mobility management module 610 performs a process related to the mobility of the MS, the call control module 612 performs call setup/release and call management for the voice or packet service of the MS, and the radio resource management module 614 supports management and assignment/release of the radio resources. The interface module 620, a module for managing the dormant state of the MS to serve as a source BSC, includes an interface processor 622, an agent processor 624, and a source BSC database 626.

The interface processor 622 is a communication input/output module for enabling various modules in the BSC to communicate with the agent processor 624 performing the connection with the centralized DB 400. The agent processor 624 transmits an information search request and an information update request received from the various modules in the BSC to the centralized DB, and then, processes the results. The source BSC database 626 stores information necessary for serving as a source BSC for the MS.

Structure of Source BSC Database

Figure 7:
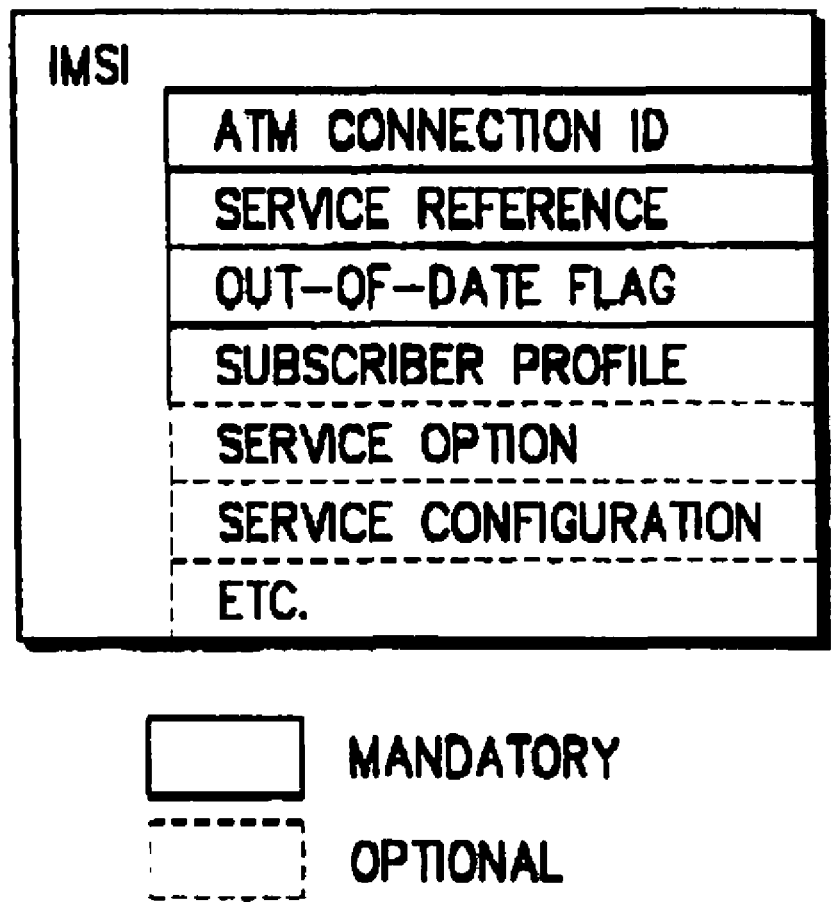
FIG. 7 is a diagram illustrating configuration of information stored in a database of a source BSC according to an embodiment of the present invention.

Meanwhile, the source BSC database managed by the source BSC to support the dormant state of the MS has a structure shown in FIG. 7. Referring to FIG. 7, IMSI (International Mobile Station Identifier) indicates an identifier for identifying the MS, and ATM Connection ID indicates an identifier for identifying ATM (Asynchronous Transfer Mode) connection established between the source BSC and the PDSN while the MS performs the packet service. Out-Of-Data Flag is a flag for indicating that the corresponding information will be deleted after a lapse of predetermined time, if the MS having entered the dormant state fails to enter the active state for a long time.

Among the above fields, the ATM Connection ID field indicates a channel identifier used when the source BSC is connected to the PDSN in the ATM mode. Otherwise, when the source BSC is connected to the PDSN in another communication mode, a different channel identifier for the corresponding communication mode is used.

Besides, like the centralized DB, the source BSC database has the optional information required for enabling the wire network to effectively support a packet service of the MS. Here, the optional information is information necessary for supporting rapid reconnection by omitting the additional negotiation and authentication process when the MS in the dormant state transits to the active state. Referring to FIG. 7, Subscriber Profile means information on the MS or a subscriber using the radio packet service, Service Option means capability information indicating whether it is possible to support such services as voice, packet and facsimile services, and Service Configuration means the configuration of information on channel structure, data rate and quality of the service supported.

Meanwhile, the present invention proposes following two approaches based on the above structures, in order to effectively manage the MSs in the dormant state.

A first approach is a "fixed source BSC plan", in which once the MS initiates the call, the source BSC continuously serves as a source until the corresponding MS releases the packet service. Such an approach is relatively easy to embody. That is, since the traffic and the signal path are simply extended according to movement of the MS, this approach can be simply embodied. Therefore, it is possible to effectively support the packet service of the MS in the initial stage of the packet service. Message exchange scenarios required for embodying the first proposed plan are illustrated in FIGS. 8 to 11.

Figure 12:
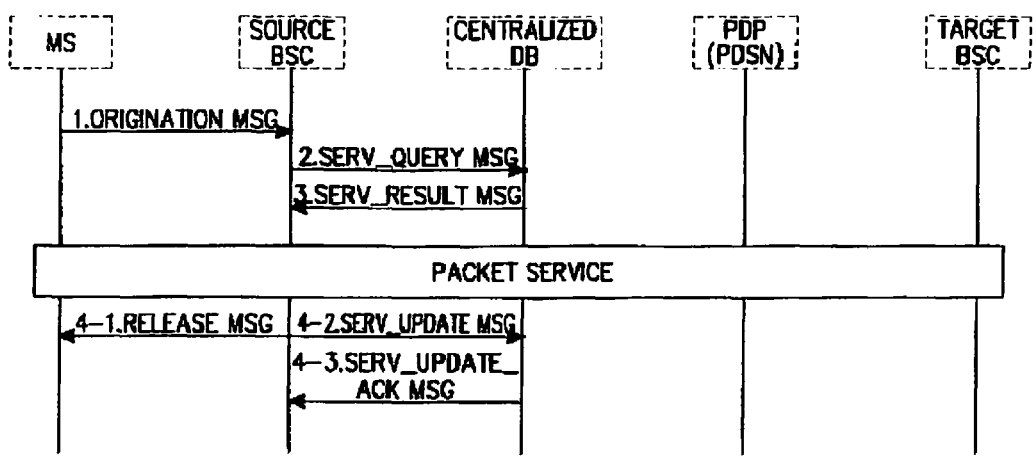
FIG. 12 is a diagram illustrating a procedure for exchanging messages during initial packet call setup in the case where the source BSC is dynamic, according to another embodiment of the present invention.
Figure 13:
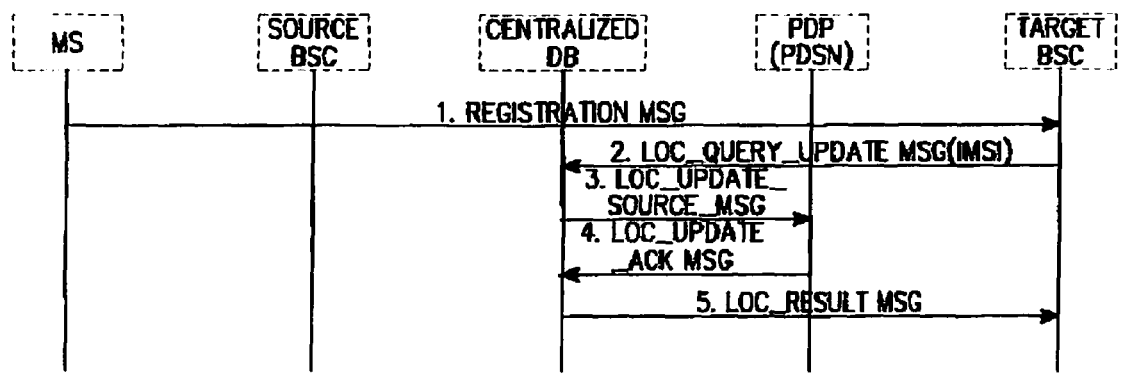
FIG. 13 is a diagram illustrating a procedure for exchanging messages to update mobility management information of a packet terminal in the case where the source BSC is dynamic, according to another embodiment of the present invention.
Figure 14:
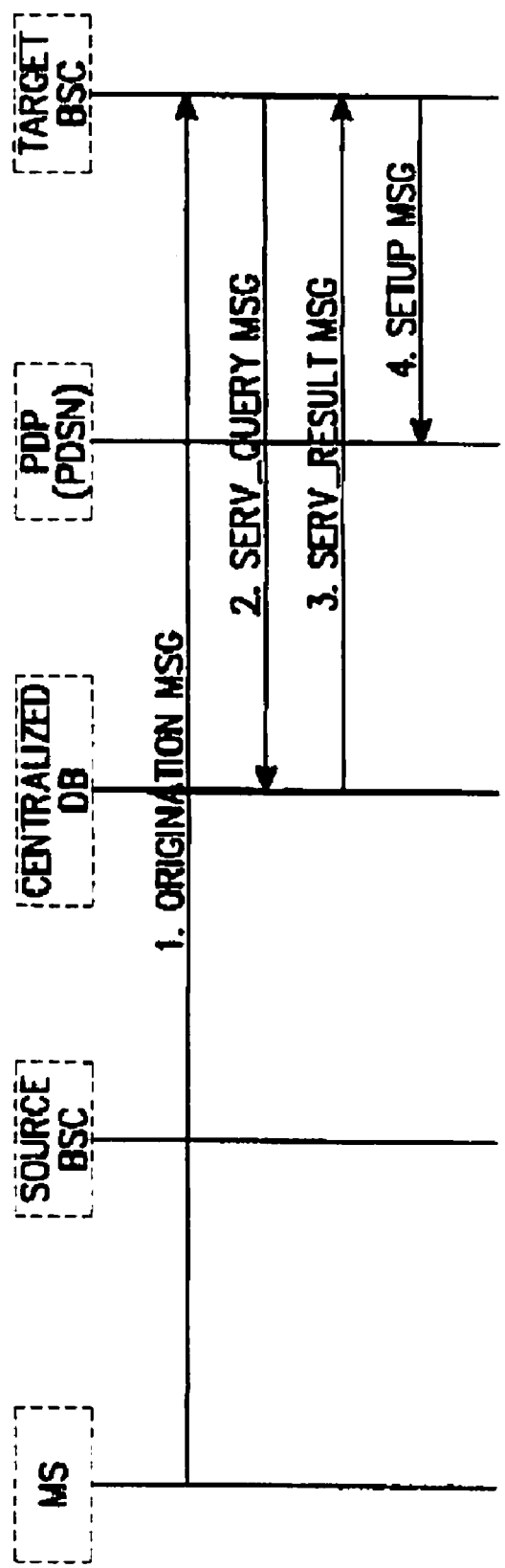
FIG. 14 is a diagram illustrating a procedure for exchanging messages due to an origination call from the packet terminal in the case where the source BSC is dynamic, according to another embodiment of the present invention.

A second approach is a "dynamic source BSC plan", unlike the first approach where the source BSC is not changed until the packet service of the MS is released, The dynamic source BSC plan is to move the source BSC for the MS to the BSC of a cell to which the MS belongs, as the MS moves. That is, the second approach is proposed to resolve the problem that occurs when a traffic path passes through a plurality of BSCs, as the MS moves. Message exchange scenarios required for embodying the second proposed plan are illustrated in FIGS. 12 to 14.

Now, a detailed description of the two proposed plans will be made with reference to the above structures. There have been proposed three different plan-based networks for the centralized DB according to an embodiment of the present invention. Herein, however, the description of the invention will be made with reference to the network based on the plan in which the centralized DB is constructed as a separate module, as set forth in FIG. 2. This is because the operation is performed in a similar manner although the invention is applied to any of the three proposed plans.

A message processing operation based on the "fixed source BSC plan" according to an embodiment of the present invention will be described with reference to the message exchange scenarios shown in FIGS. 8 to 11.

Figure 8:
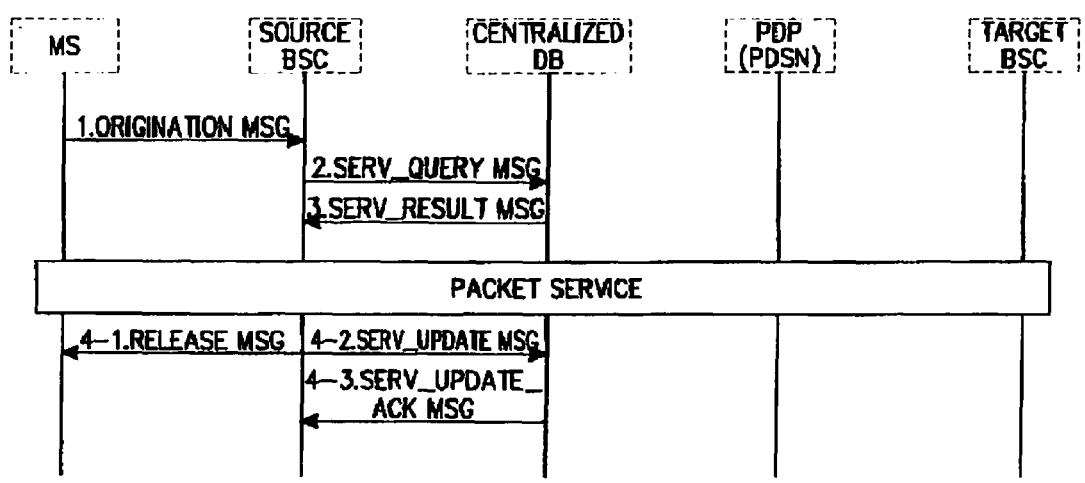
FIG. 8 is a diagram illustrating a procedure for exchanging messages during initial packet call setup in the case where the source BSC is fixed, according to an embodiment of the present invention.

First, a message exchange scenario performed during initial packet call setup in the case where the source BSC is fixed will be described with reference to FIG. 8. Referring to FIG. 8, in Step #1, the MS transmits an origination message to the BSC to attempt a PPP (Point-to-Point Protocol) access for the purpose of a packet service. Here, the BSC becomes a source BSC. The transmitted origination message is received at the BSC serving a cell in which the MS is located. In Step #2, upon receipt of the origination message, the BSC transmits to the centralized DB 400 a query message Serv_Query_MSG followed by an acknowledgement from the MS. The query message Serv_Query_MSG includes IMSI information designating the MS that has transmitted the origination message.

The centralized DB 400 processes the Serv_Query_MSG transmitted from the BSC. More specifically, the interface processor 402 in the centralized DB 400 receives the Serv_Query_MSG and provides it to the transaction processor 404. The transaction processor 404 then searches the dormant information stored in the dormant state DB 406, and determines whether there exists the dormant information corresponding to the Serv_Query_MSG. Determining whether there exists the dormant information is performed by determining whether there exists dormant information corresponding to the IMSI included in the Serv_Query_MSG The dormant information, as described with reference to FIG. 5, is information required for the rapid reconnection or for tracking the location of the dormant state MS.

Figure 10:
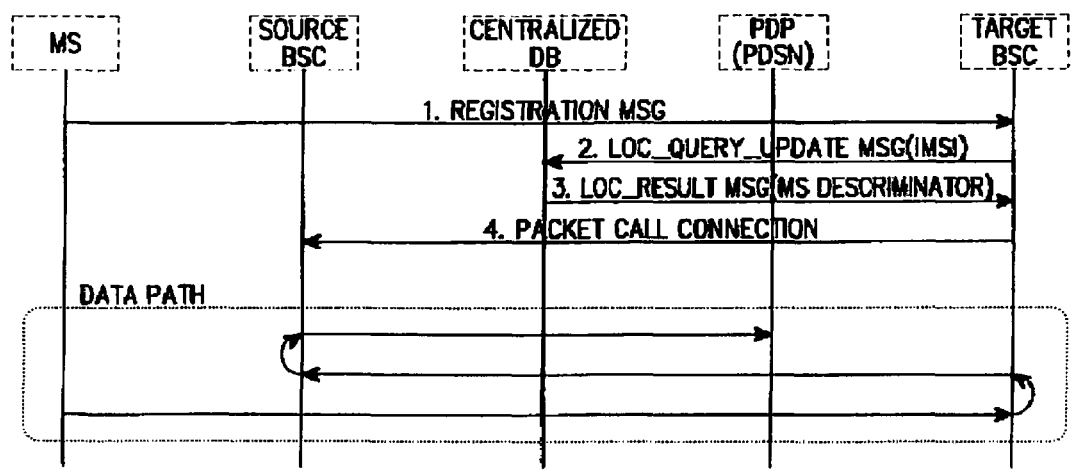
FIG. 10 is a diagram illustrating a procedure for exchanging messages due to an origination call from the packet terminal in the case where the source BSC is fixed, according to an embodiment of the present invention.

If the Serv_Query_MSG provided by the origination message from the MS is for the transition from the dormant state to the active state, the corresponding dormant information is stored in the dormant state DB 406. If the MS requests the packet service for the first time, or that the MS request the packet service for the first time after moving from another MSC the corresponding dormant information is not stored in the dormant state DB 406. If it is determined through the search that the dormant information of the corresponding MS is not stored, the transaction processor 404 transmits to the BSC a response message Serv_Result_MSG indicating that there is no dormant information for the MS, in Step #3. However, if it is determined that the dormant information of the corresponding MS is stored, an operation of FIG. 10 is performed, which will be described later.

Upon receipt of the Serv_Result_MSG from the centralized DB 400, the BSC determines whether the origination message received from the MS is an origination message caused by a new call or a call incoming from another MSC. Determining whether to designate the BSC as a source BSC for the corresponding MS is performed based on whether the origination message is an origination message caused by a new call or a call incoming from another MSC. If it is determined from the Serv_Result_MSG that the origination message from the MS is an origination message caused by a new call or a call incoming from another MSC, the BSC assigns an internal traffic processor (ATP) according to a load balancing rule. The ATP is a processor for controlling the overall operation for providing the packet service to the MS. In addition to the assignment of the ATP, the source BSC sets as a new call the information caused by the call attempted by the MS through the MSC/VLR, and then separately manages information on the set new call. In order to configure the information on the new call, it is necessary to determine PPP address and PPP ID of the PDP (PDSN).

The operation of registering a new call through the MSC/VLR is an operation commonly performed to provide an initial packet service, so the detailed description will be omitted. When the new call setup process is completed, the MS performs the packet communication service through the source BSC according to the standard.

During the packet communication service, the source BSC monitors whether the MS transits to the suspended state or the dormant state. As mentioned above, the transition to the suspended state or the dormant state takes place when no data is exchanged for a predetermined time. Upon detecting the MS's transition to the suspended state or the dormant state, the source BSC proceeds to Step #4-1. In Step #4-1, the source BSC releases the currently assigned connection (channel) by transmitting a release message to the MS. Further, in Step #4-2, the source BSC transmits to the centralized DB 400 a Serv_Update_MSG message for requesting update of the dormant information corresponding to the MS transited to the suspended state or the dormant state. Here, the Serv_Update_MSG includes the dormant information of the corresponding MS. The dormant information is information necessary for the resumption of the packet service to the MS transited to the suspended state or the dormant state, and its exemplary structure is shown in FIG. 5.

Upon receipt of the Serv_Update_MSG, the centralized DB 400 creates a new DB field into its internal dormant state DB 406, and stores the dormant information included in the Serv_Update_MSG in the created field. After completion of storing the dormant information, the centralized DB 400 proceeds to Step #4-3 to transmit to the source BSC a Serv_Update_Ack_MSG message indicating that update of the dormant information has been normally completed, thus completing the initial packet call setup process.

Although a detailed description has not been made regarding a common operation in which the state transition does not happen and the packet service is normally ended after the MS sets up the initial packet call, the operation will be performed in the same process as the conventional process.

The above embodiment has disclosed a scheme for updating the dormant information of the MS in the centralized DB 400 at the point in time where the MS transits from the active state to the suspended state or the dormant state after completion of the initial packet call setup. However, an alternative embodiment creates a new DB field prior to performing the packet service when there exists no information on the corresponding call in the centralized DB 400, and then updates the dormant information of the MS for the call. In this case, it is necessary to define a field for the dormant information to be updated in the Serv_Query_MSG transmitted in Step #2 of FIG. 8, and the procedure performed in Steps #4-2 and #4-3 of FIG. 8 must be included in the procedure performed in Steps #2 and #3 of FIG. 8.

Second, in a message exchange scenario for update of the mobility management information of a packet terminal in the case where the source BSC is fixed, a target BSC updates location information of the dormant information managed in the centralized DB upon receipt of a registration message due to an idle handoff of the dormant state MS. This will be described in detail with reference to FIG. 9.

Figure 9:
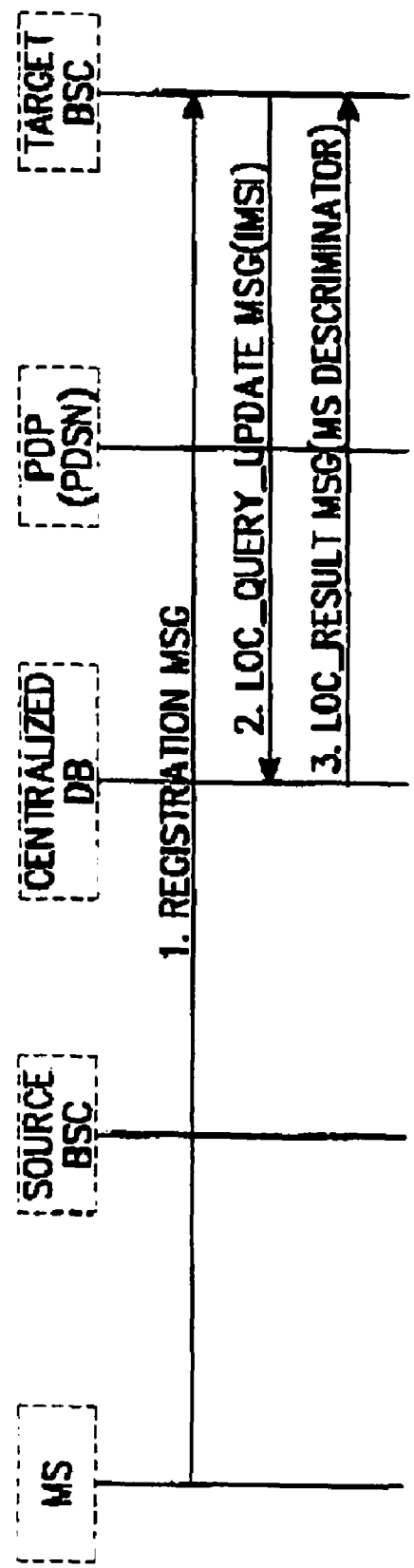
FIG. 9 is a diagram illustrating a procedure for exchanging messages to update mobility management information of a packet terminal in the case where the source BSC is fixed, according to an embodiment of the present invention.

Referring to FIG. 9, in Step #1, the MS in the dormant state transmits a registration message due to an idle handoff, and the location registration message transmitted by the MS is received at a target BSC. The "target BSC" refers to a BSC to which the moving MS desires to be registered. Upon receipt of the location registration message in Step #1, the target BSC transmits, though not illustrated, a location updating request message to the MSC to update the location information managed in the VLR.

In Step #2, the target BSC transmits a location update msg Loc_Query_Update_MSG to the centralized DB 400 to determine whether a packet service of the MS from which the registration message has been received is activated and updates the location information. The Loc_Query_Update_MSG must include the IMSI for identifying the corresponding MS. The location information, as stated above, is information on the place where the MS is currently located. For example, a BSC identifier for identifying the target BSC can be used for the location information. Upon receipt of the Loc_Query_Update_MSG, the centralized DB 400 determines whether there exists the dormant information for the corresponding MS using the IMSI constituting the Loc_Query_Update_MSG. If it is determined that the dormant information of the MS exists, the centralized DB 400 determines that the corresponding MS is a dormant state MS whose packet service is activated, using a location update result message Loc_Result_MSG transmitted to the target BSC in Step #3. In addition, the centralized DB 400 updates the location information for the MS based on the location information (identifier of the target BSC) constituting the Loc_Query_Update_MSG. Upon receipt of the location result message Loc_Result_MSG indicating activation of the packet service, the target BSC regards the packet service state of the corresponding MS as the dormant state or the null state. The reason is because the dormant information managed in the centralized DB 400 proves that the corresponding MS is in the dormant state or the null state. However, upon failure to find the dormant information for the corresponding MS, the centralized DB 400 informs that the packet service of the MS is not activated, using the location result message Loc_Result_MSG transmitted to the target BSC in Step #3.

Third, in a message exchange scenario caused by an origination call from a packet terminal in the case where the source BSC is fixed, a target BSC is provided with the dormant information for the corresponding MS from the centralized DB 400 upon receipt of an origination message from the MS in the dormant state, and provides a packet service to the corresponding MS using the provided dormant information. This will be described in detail with reference to FIG. 10.

In order to resume the packet service, the MS in the dormant state transmits an origination message to the BSC. That the MS in the dormant state has transmitted an origination message is equivalent to requesting transition to the active state. Referring to FIG. 10, in Step #1, the transmitted origination message is provided to a BSC where the MS is currently located. Here, the BSC provided with the origination message becomes a target BSC of the MS. In Step #2, the target BSC transmits to the centralized DB 400 a dormant information request message Serv_Query_MSG for requesting dormant information of the MS. The Serv_Query_MSG must include IMSI for selecting dormant information for the MS out of the information stored in the centralized DB 400 and a target BSC ID for providing the selected dormant information.

Upon receipt of the Serv_Query_MSG, the centralized DB 400 searches the dormant information of the corresponding MS based on the IMSI included in the Serv_Query_MSG Searching the dormant information is performed by comparing the IMSIs stored in the centralized DB 400 with the IMSI provided from the target BSC and determining whether there exists the same IMSI. After completing the dormant search, the centralized DB 400 transmits the search results to the target BSC through a search result message Serv_Result_MSG in Step #3 of FIG. 10. The Serv_Result_MSG has dormant information including the source BSC ID. Upon receipt of the dormant information of the corresponding MS through the Serv_Result_MSG, the target BSC attempts packet call connection to the source BSC in Step #4. If the packet call connection is set up, the packet call to the MS is reconnected by connecting the internal PDP to the network through the source BSC. This means the transition from the dormant state to the active state.

Therefore, by managing the dormant information for the MS in the dormant state in the centralized DB 400 accessible by every BSC in the same MSC, it is possible to rapidly perform the packet service when the transition to the active state occurs due to the call origination by the MS.

Fourth, in a message exchange scenario caused by a termination call to a packet terminal in the case where the source BSC is fixed, if a termination call to the dormant state MS located in a target BSC is generated from the MSC, a source BSC informs the target BSC of the terminal call by consulting the centralized DB 400, and the target BSC provides the information to the corresponding MS, thus provides a packet service to the MS by receiving a response message. This will be described in detail with reference to FIG. 11.

Figure 11:
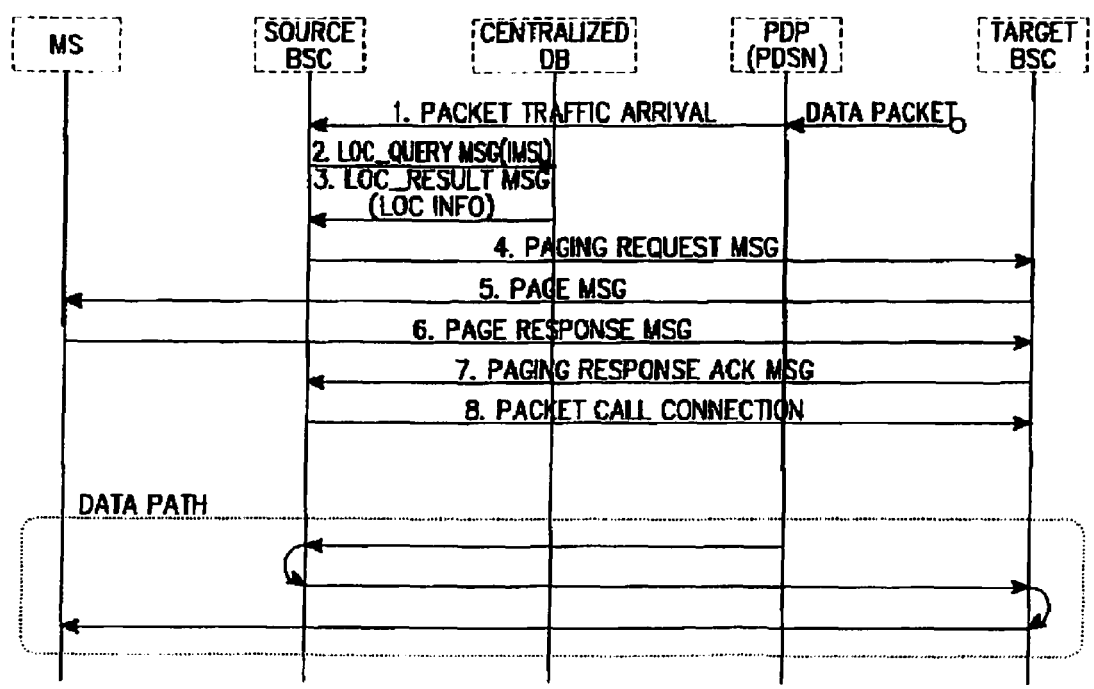
FIG. 11 is a diagram illustrating a procedure for exchanging messages due to a termination call to the packet terminal in the case where the source BSC is fixed, according to an embodiment of the present invention.

Referring to FIG. 11, in Step #1, the source BSC receives a packet arrival event upon receipt of a termination call requesting termination to a certain MS from a given PDP through an interface link (a communication link between the source BSC and the PDSN). In Step #2, the source BSC transmits to the centralized DB 400 a query message Loc_Query_MSG (MISI) for determining a location of the corresponding MS in response to the termination call. The query message Loc Query_MSG includes IMSI information for identifying the MS. The centralized DB 400 searches the location information of the corresponding MS based on the IMSI. After the search, the centralized DB 400 transmits the searched location information of the MS to the source BSC through a location information message Loc_Result_MSG (Loc Info) in Step #3. Upon receipt of the location information of the MS, the source BSC analyzes the location of the corresponding MS based on the received location information. After analyzing the location of the MS, the source BSC transmits a paging request message to the target BSC where the MS is located, in Step #4. Though not illustrated in the drawing, upon failure to receive a response message Paging_Response_Ack_MSG in response to the paging request message for a predetermined time, the source BSC performs an operation according to a paging algorithm.

Upon receipt of the paging request message, the target BSC transmits a page message Page_MSG to every MS in its cell area through a broadcasting channel in Step #5. Upon receipt of the page message transmitted through the broadcasting channel, the MS transmits a page response message to the target BSC in response to the page message in Step #6. Upon receipt of the page response message, the target BSC transmits a paging response acknowledge message to the source BSC in order to set up a packet call in Step #7. Upon receipt of the paging response acknowledge message from the target BSC, the source BSC transmits a packet call connection message for call connection to the target BSC in Step #8. Upon receipt of the packet call connection message, the target BSC performs an operation for the packet service.

A packet reception path to the MS for the packet service is connected in the sequence of PDP (PDSN)→source BSC→target BSC→MS as represented by a bold solid line. On the other hand, a transmission path from the MS for the packet service has a reverse direction of the reception path.

To sum up, in the first plan, if the MS initially sets up a call at BSC#1 and then moves to BSC#2, BSC#3 and BSC#4, a traffic path for the packet service caused by a termination call is set in the sequence of PDSN→source BSC#1→BSC#2→BSC#3→BSC#4 →MS, while a traffic path for the packet service caused by an origination call is set in the sequence of MS→BSC#4→BSC#3→BSC#2→source BSC#1→PDSN.

Next, a message processing operation based on the "dynamic source BSC plan" according to another embodiment of the present invention will be described with reference to the message exchange scenarios shown in FIGS. 12 to 15.

First, a message exchange scenario performed during initial packet call setup in the case where the source BSC is dynamically changed according to movement of the MS will be described with reference to FIG. 12. Referring to FIG. 12, in Step #1, the MS transmits an origination message to the BSC to attempt a PPP (Point-to-Point Protocol) access for the purpose of a packet service. The transmitted origination message is received at the BSC serving a cell to which the MS belongs. In Step #2, upon receipt of the origination message, the BSC transmits to the centralized DB 400 a query message Serv_Query_MSG followed by an acknowledgement from the MS. The query message Serv_Query_MSG includes information (MS identifier, hereinafter referred to as IMSI) designating the MS that has transmitted the origination message.

The centralized DB 400 processes the Serv_Query_MSG transmitted from the BSC. More specifically, the interface processor 402 in the centralized DB 400 receives the Serv_Query MSG, and provides it to the transaction processor 404. The transaction processor 404 then searches the dormant information stored in the dormant state DB 406, and determines whether there exists the dormant information corresponding to the Serv_Query_MSG Determining whether there exists the dormant information is performed by determining whether there exists dormant information corresponding to the IMSI included in the Serv_Query_MSG. The dormant information, as described with reference to FIG. 5, is information required for the rapid reconnection or for tracking the location of the dormant state MS.

Figure 15:
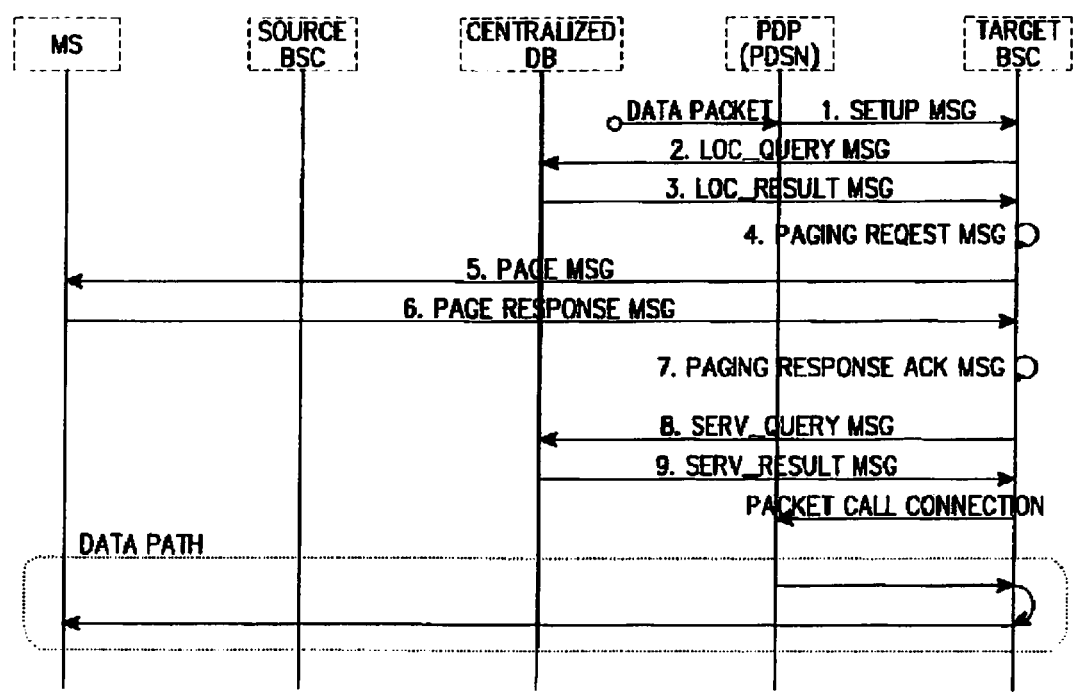
FIG. 15 is a diagram illustrating a procedure for exchanging messages due to a termination call to the packet terminal in the case where the source BSC is dynamic, according to another embodiment of the present invention.

If the Serv_Query_MSG provided by the origination message from the MS is for the transition from the dormant state to the active state, the corresponding dormant information is stored in the dormant state DB 406. If the MS requests the packet service for the first time, or that the MS request the packet service for the first time after moving from another MSC, the corresponding dormant information is not stored in the dormant state DB 406. If it is determined through the search that the dormant information of the corresponding MS is not stored, the transaction processor 404 transmits to the BSC a response message Serv_Result_MSG indicating that there is no dormant information for the MS, in Step #3. However, if it is determined that the dormant information of the corresponding MS is stored, an operation of FIG. 15 is performed, which will be described later.

Upon receipt of the Serv_Result_MSG from the centralized DB 400, the BSC determines whether the origination message received from the MS is an origination message caused by a new call or a call incoming from another MSC. Determining whether to designate the BSC as a source BSC for the corresponding MS is performed based on whether the origination message is an origination message caused by a new call or a call incoming from another MSC. If it is determined from the Serv_Result_MSG that the origination message from the MS is an origination message caused by a new call or a call incoming from another MSC, the BSC assigns an internal traffic processor (ATP) according to a load balancing rule. The ATP is a processor for controlling the overall operation for providing the packet service to the MS. In addition to assignment of the ATP, the source BSC sets as a new call the information caused by the call attempted by the MS through the MSC/VLR, and then separately manages information on the set new call. In order to configure the information on the new call, it is necessary to determine PPP address and PPP ID of the PDP (PDSN).

The operation of registering a new call through the MSC/VLR is an operation commonly performed to provide an initial packet service, so the detailed description will be omitted. When the new call setup process is completed, the MS performs the packet communication service through the source BSC according to the standard.

During the packet communication service, the source BSC monitors whether the MS transits to the suspended state or the dormant state. As mentioned above, the transition to the suspended state or the dormant state takes place when no data is exchanged for a predetermined time. Upon detecting the MS's transition to the suspended state or the dormant state, the source BSC proceeds to Step #4-1. In Step #4-1, the source BSC releases the currently assigned connection (channel) by transmitting a release message to the MS. Further, in Step #4-2, the source BSC transmits to the centralized DB 400 a Serv_Update_MSG message for requesting update of the dormant information corresponding to the MS transited to the suspended state or the dormant state. Here, the Serv_Update_MSG must include the dormant information of the corresponding MS. The dormant information means information necessary for resumption of the packet service to the MS transited to the suspended state or the dormant state, and its exemplary structure is shown in FIG. 5.

Upon receipt of the Serv_Update_MSG, the centralized DB 400 creates a new DB field into its internal dormant state DB 406, and stores the dormant information included in the Serv_Update_MSG in the created field. After completion of storing the dormant information, the centralized DB 400 proceeds to Step #4-3 to transmit to the source BSC a Serv_Update_Ack_MSG message indicating that update of the dormant information has been normally completed, thus completing the initial packet call setup process.

Although a detailed description has not been made regarding a common operation in which the state transition does not happen and the packet service is normally ended after the MS sets up the initial packet call, the operation will be performed in the same process as the conventional process.

The above embodiment has disclosed a scheme for updating the dormant information of the MS in the centralized DB 400 at the point in time where the MS transits from the active state to the suspended state or the dormant state after completion of the initial packet call setup. However, an alternative embodiment creates a new DB field prior to performing the packet service when there exists no information on the corresponding call in the centralized DB 400, and then updates the dormant information of the MS for the call. In this case, it is necessary to define a field for recording the dormant information to be updated in the Serv_Query_MSG transmitted in Step #2 of FIG. 12, and the procedure performed in Steps #4-2 and #4-3 of FIG. 12 must be included in the procedure performed in Steps #2 and #3 of FIG. 12.

Second, a message exchange scenario for update of the mobility management information of a packet terminal in the case where the source BSC is dynamically changed according to movement of the MS, will be described in detail with reference to FIG. 13.

Referring to FIG. 13, in Step #1, the MS in the dormant state transmits a registration message due to an idle handoff, and the location registration message transmitted by the MS is received at a target BSC. The "target BSC" refers to a BSC to which the moving MS desires to be registered. That is, the target BSC includes all the BSCs other than the source BSC of the corresponding MS, among the BSCs constituting the same MSC. Upon receipt of the location registration message in Step #1, the target BSC transmits, though not illustrated, a location updating request message to the MSC to update the location information managed in the VLR.

In Step #2, the target BSC transmits a location update message Loc_Query_Update_MSG to centralized DB 400 to determine whether a packet service of the MS from which the registration message has been received is activated and updates the location information. The Loc_Query_Update_MSG must include the IMSI for identifying the corresponding MS. The location information, as stated above, is information on the place where the MS is currently located. For example, a BSC identifier for identifying the target BSC can be used for the location information. Upon receipt of the Loc_Query_Update_MSG, the centralized DB 400 transmits in Step #3 to a PDP a location information update request message Loc_Update_Source_MSG for requesting that the source BSC corresponding to the MS that has transmitted the registration message should be changed to a target BSC. Upon receipt of the location information update request message Loc_Update_Source_MSG, the PDP transmits an acknowledge message Loc_Update_Ack_MSG to the centralized DB 400 after designating the target BSC as a new source BSC.

Upon receipt of the acknowledge message Loc_Update_Ack_MSG, the centralized DB 400 searches for the MS in the dormant information using the IMSI in the LocQuery_Update_MSG. After finding the dormant information for the MS, the centralized DB 400 informs that the corresponding MS is a dormant state MS whose packet service is activated, using a location result message Loc_Result_MSG transmitted to the updated source BSC in Step #5. In addition, the centralized DB 400 updates the location information for the MS based on the location information (identifier of the target BSC) constituting the LocQuery_Update_MSG. Upon receipt of the location result message Loc_Result_MSG indicating activation of the packet service, the updated source BSC regards the packet service state of the corresponding MS as the dormant state or the null state. The fact that the dormant information is managed in the centralized DB 400 proves that the corresponding MS is in the dormant state or the null state. However, upon failure to find the dormant information for the corresponding MS, the centralized DB 400 informs that the packet service of the MS is not activated, using the location result message Loc_Result_MSG transmitted to the updated source BSC in Step #5.

Third, a message exchange scenario caused by an origination call from a packet terminal in the case of the source BSC is dynamically changed according to movement of the MS will be described in detail with reference to FIG. 14.

In order to resume the packet service, the MS in the dormant state transmits an origination message to the BSC. The fact that the MS in the dormant state has transmitted an origination message is equivalent to requesting transition to the active state. Referring to FIG. 14, in Step #1, the transmitted origination message is provided to a BSC where the MS is currently located. Here, the BSC provided with the origination message becomes a target BSC of the MS. In Step #2, the target BSC transmits to the centralized DB 400 a dormant information request message Serv_Query_MSG for requesting dormant information of the MS. The Serv_Query_MSG must include the IMSI for selecting dormant information for the MS out of the information stored in the centralized DB 400 and a target BSC ID for providing the selected dormant information.

Upon receipt of the Serv_Query_MSG the centralized DB 400 searches the dormant information of the corresponding MS based on the IMSI included in the Serv_Query_MSG Searching the dormant information is performed by comparing the IMSIs stored in the centralized DB 400 with the IMSI provided from the target BSC and determining whether there exists the same IMSI. After completing the dormant search, the centralized DB 400 transmits the search results to the target BSC through a search result message Serv_Result_MSG in Step #3 of FIG. 14. The Serv_Result_MSG has dormant information including the source BSC ID. Upon receipt of the dormant information of the corresponding MS through the Serv_Result_MSG, the target BSC connects a packet call to the MS by connecting the internal PDP to the network based on the provided dormant information in Step #4 of FIG. 14.

Therefore, by managing the dormant information for the MS in the dormant state in the centralized DB 400 accessible by every BSC in the same MSC, it is possible to rapidly perform the packet service when the transition to the active state occurs due to the call origination by the MS.

As described above, when the source BSC is dynamically changed according to movement of the MS, the target BSC is designated as a new source BSC in the centralized DB 400, so that the packet service is performed without passing through the existing source BSC. That is, the target BSC (the updated source BSC) performs the packet service directly with the PDP (PDSN).

Fourth, a message exchange scenario caused by a termination call to a packet terminal in the case where the source BSC is dynamically changed according to movement of the MS will be described in detail with reference to FIG. 15.

Referring to FIG. 15, in Step #1, the PDSN transmits a setup message to a target BSC upon receipt of a data packet from a certain PDP. In Step #2, the target BSC transmits to the centralized DB 400 a query message Loc_Query_MSG for determining a location of the corresponding MS in response to the setup message. The query message Loc_Query_MSG includes IMSI information for identifying the MS. The centralized DB 400 searches the location information of the corresponding MS based on the IMSI. After completion of the search, the centralized DB 400 transmits the searched location information of the MS to the target BSC through a message Loc_Result_MSG in Step #3. Upon receipt of the location information of the MS, the target BSC analyzes the location of the corresponding MS based on the received location information. After analyzing the location of the MS, the target BSC transmits a paging request message to itself in Step #4. Though not illustrated in the drawing, upon failure to receive a paging request acknowledge message for a predetermined time, the target BSC performs a paging algorithm.

Upon receipt of the paging request message, the target BSC transmits a page message Page_MSG to every MS in its cell area through a broadcasting channel in Step #5. Upon receipt of the page message transmitted through the broadcasting channel, the MS transmits a page response message to the target BSC in response to the page message in Step #6. Upon receipt of the page response message, the target BSC transmits a paging response acknowledge message to itself in order to set up a packet call in Step #7.

In Step #8, the target BSC transmits to the centralized DB 400 a query message Serv_Query_MSG for requesting service information of the MS. Then, in Step #9, the centralized DB 400 searches the service information of the MS and transmits to the target BSC a Serv_Result_MSG message indicating the searched service information. The Serv_Result_MSG includes PPP information for the MS. The target BSC transmits a packet call connection request to the PDSN based on the received information.

A packet reception path to the MS for the packet service according to the second embodiment is connected in the sequence of PDP (PDSN)→target BSC→MS as represented by a bold solid line. On the other hand, a transmission path from the MS for the packet service has a reverse direction of the reception path.

As described above, since the PPP information of the packet service calls entered in the dormant state is managed in the centralized DB, the present invention has the following advantages:

(1) The IS-95B or CDMA-2000 mobile communication system can manage the location of a packet call in the dormant state without modification of BSC/HLR/VLR and MS.

(2) The BSC can perform by itself call terminal and call origination on a packet terminal in the dormant state.

(3) The MS in the dormant state can make a reconnection to a previous PPP access point in case of call origination.

(4) It is possible to provide a rapid reconnection function when the MS in the dormant state is activated for packet transmission.

(5) It is possible to support simple structure, which can be embodied with the additional module of the existing devices such as VLR and BSC.

(6) It is possible to minimize a load on the wire and wireless stages, since the registration and authentication process is not performed again during reconnection of the packet call in the dormant state.

(7) When the centralized DB is embodied with a separate device, the location management processor such as MSC/VLR has reduced load, so that it is possible to effectively manage the maximum number of subscribers in the MSC.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for storing dormant state information of mobile stations in a dormant state where no packet data is exchanged with an external packet network, in a centralized database connected to a packet data switch, and updating the dormant state information stored in the centralized database in association with the mobile station when the mobile station in the dormant state moves to a target Base Station Controller (BSC) adjacent to a source BSC in a wireless packet data system including a Packet Data Switch Node (PDSN) for connecting the external packet network to the mobile stations through the packet data switch and the source BSC connected to the packet data switch, the method comprising the steps of:

receiving, by the target BSC, from the mobile station a location registration message when the mobile station moves to the target BSC adjacent to the source BSC;

upon receipt of the location registration message, transmitting by the target BSC, to the centralized database a location update message for updating a location of the mobile station, and transmitting by the source BSC, to the target BSC where the mobile station is located a paging request message for requesting paging of the mobile station;

upon receipt of the location update message, updating by the centralized database, the dormant state information for the mobile station and transmitting, by the source BSC, to the target BSC, a packet call connection message requesting connection of the packet data so as to connect the target BSC to the source BSC; and transmitting by the centralized database to the target BSC a location update result message indicating complete update of the dormant state information.

2. The method as claimed in claim 1, wherein the dormant state information includes an IDentifier (ID) of the mobile station, location information of the mobile station, a last registration time of the mobile station, and a source BSC ID of the mobile station.

3. The method as claimed in claim 2, wherein the dormant state information includes IDs for connections used to exchange packet data of the mobile station in the dormant state, a temporary ID assigned to the mobile station, a service option and service configuration.

4. The method as claimed in claim 1, wherein the location update message includes an IDentifier (ID) of the mobile station, and location information of the mobile station.

5. The method as claimed in claim 4, wherein the location information of the mobile station is an ID of the target BSC.

6. A method for reconnecting an exchange of packet data between a mobile station and an external packet network by storing dormant state information of mobile stations in a dormant state where no packet data is exchanged with the external packet network, in a centralized database connected to a packet data switch, and updating the dormant state information stored in the centralized database in association with the mobile station when the mobile station in the dormant state moves to a target Base Station Controller (BSC) adjacent to a source BSC in a wireless packet data system including a Packet Data Switch Node (PDSN) for connecting the external packet network to the mobile stations through the packet data switch and the source BSC connected to the packet data switch, the method comprising the steps of:

receiving, by the target BSC, from the mobile station an origination message for requesting transmission of packet data;

upon receipt of the origination message, transmitting, by the target BSC, to the centralized database a dormant state information request message for requesting dormant information;

upon receipt of the dormant state information request message, searching by the centralized database, dormant state information stored in association with the mobile station and transmitting the searched dormant state information using a search result message to the target BSC; and upon receipt of the search result message, transmitting, by the target BSC, to the source BSC, a packet call connection message for requesting reconnection of the packet call and thus connecting the source BSC to the target BSC through the packet data switch;

monitoring, by the source BSC, whether the mobile station transits to a suspended state or the dormant state, while the mobile station uses a packet communication service;

if the mobile station is transition to the suspended state or the dormant state, releasing, by the source BSC, a channel, which is currently assigned to the mobile station, by transmitting a channel release message to the mobile station;

transmitting, by the source BSC, to the centralized database, an update request message for updating the dormant state information; and updating, by the centralized database, the dormant state information.

7. The method as claimed in claim 6, wherein the dormant state information includes an IDentifier (ID) of the mobile station, location information of the mobile station, a last registration time of the mobile station, and a source BSC ID of the mobile station.

8. The method as claimed in claim 7, wherein the dormant state information includes IDs for connections used to exchange packet data of the mobile station in the dormant state, a temporary ID assigned to the mobile station, a service option and service configuration.

9. The method as claimed in claim 6, wherein the dormant state information request message includes an IDentifier (ID) of the mobile station, and an ID of the target BSC.

10. The method as claimed in claim 6, wherein the search result message includes an IDentifier (ID) of the source BSC.

11. A method for storing dormant state information of mobile stations in a dormant state where no packet data is exchanged with an external packet network, in a centralized database connected to a packet data switch, and updating the dormant state information stored in the centralized database in association with the mobile station when the mobile station in the dormant state moves to a target Base Station Controller (BSC) adjacent to a source BSC in a wireless packet data system including a Packet Data Switch Node (PDSN) for connecting the external packet network to the mobile stations through the packet data switch and the source BSC connected to the packet data switch, the method comprising the steps of:

transmitting to the target BSC a location registration message when the mobile station moves to the target BSC adjacent to the source BSC;

upon receipt of the location registration message, transmitting from the target BSC to the centralized database a location update message for updating a location of the mobile station, and transmitting, from the source BSC to the target BSC where the mobile station is located, a paging request message for requesting paging of the mobile station;

upon receipt of the location update message, transmitting from the centralized database to the PDSN a location information update request message for requesting designation of the target BSC as a source BSC and transmitting, from the source BSC to the target BSC, a packet call connection message requesting connection of the packet data, so as to connect the target BSC to the source BSC;

upon receipt of the location information update request message, designating by the PDSN the target BSC as a new source BSC and transmitting an acknowledge message to the centralized database; and upon receipt of the acknowledge message, updating by the centralized database the dormant state information for the mobile station by the centralized database and transmitting a location update result message indicating complete update of the dormant state information to the target BSC.

12. The method as claimed in claim 11, wherein the dormant state information includes an IDentifier (ID) of the mobile station, location information of the mobile station, a last registration time of the mobile station, and a source BSC ID of the mobile station.

13. The method as claimed in claim 12, wherein the dormant state information includes IDs for connections used to exchange packet data of the mobile station in the dormant state, a temporary ID assigned to the mobile station, a service option and service configuration.

14. The method as claimed in claim 12, wherein the location update message includes an ID of the mobile station, and location information of the mobile station.

15. The method as claimed in claim 14, wherein the location information of the mobile station is an ID of the target BSC.

16. A method for reconnecting an exchange of packet data between a mobile station and an external packet network by storing dormant state information of mobile stations in a dormant state where no packet data is exchanged with the external packet network, in a centralized database connected to a packet data switch, and updating the dormant state information stored in the centralized database in association with the mobile station when the mobile station in the dormant state moves to a target Base Station Controller (BSC) adjacent to a source BSC in a wireless packet data system including Packet Data Switch Node (PDSN) for connecting the external packet network to the mobile stations through the packet data switch and the source BSC connected to the packet data switch, the method comprising the steps of:

transmitting, by the mobile station, to the target BSC an origination message for requesting transmission of packet data;

upon receipt of the origination message, transmitting, by the target BSC, to the centralized database a dormant information request message for requesting dormant information;

upon receipt of the dormant information request message, searching, by the centralized database, dormant state information stored in association with the mobile station, and transmitting the searched dormant state information to the target BSC using a search result message; and upon receipt of the search result message, connecting, by the target BSC, the mobile station to the PDSN through the packet data switch based on the dormant state information included in the search result message, monitoring, by the source BSC, whether the mobile station transits to a suspended state or the dormant state, while the mobile station uses a packet communication service;

if the mobile station is transited to the suspended state or the dormant state, releasing, by the source BSC, a currently assigned channel by transmitting a channel release message to the mobile station;

transmitting, by the source BSC, to the centralized database, an update request message for updating the dormant state information; and updating, by the centralized database, the dormant state information.

17. The method as claimed in claim 16, wherein the dormant state information includes an IDentifier (ID) of the mobile station, location information of the mobile station, a last registration time of the mobile station, and a source BSC ID of the mobile station.

18. The method as claimed in claim 17, wherein the dormant state information includes IDs for connections used to exchange packet data of the mobile station in the dormant state, a temporary ID assigned to the mobile station, a service option and service configuration.

19. The method as claimed in claim 16, wherein the dormant state information request message includes an IDentifier (ID) of the mobile station, and an ID of the target BSC.

* * * * *